(12) United States Patent
Chen et al.

(10) Patent No.: US 8,792,188 B2
(45) Date of Patent: Jul. 29, 2014

(54) IMAGING LENS AND PORTABLE ELECTRONIC APPARATUS HAVING THE SAME

(71) Applicant: Genius Electronic Optical Co., Ltd., Taichung (TW)

(72) Inventors: Shih-Han Chen, Taichung (TW); Feng Chen, Taichung (TW); Guan-Ning Huang, Taichung (TW)

(73) Assignee: GeniuS Electronic Optical Co., Ltd. (TW)

( * ) Notice: Subject to any disclaimer, the term of this patent is extended or adjusted under 35 U.S.C. 154(b) by 0 days.

(21) Appl. No.: 13/800,107

(22) Filed: Mar. 13, 2013

(65) Prior Publication Data

US 2014/0132823 A1 May 15, 2014

(30) Foreign Application Priority Data

Nov. 15, 2012 (CN) .......................... 2012 1 0458537

(51) Int. Cl.

| | |
|---|---|
| G02B 9/34 | (2006.01) |
| G02B 13/16 | (2006.01) |
| H04N 5/225 | (2006.01) |
| G03B 13/00 | (2006.01) |
| H04N 5/232 | (2006.01) |
| G02B 3/00 | (2006.01) |
| G02B 7/00 | (2006.01) |
| G02B 9/00 | (2006.01) |
| G02B 11/00 | (2006.01) |
| G02B 13/00 | (2006.01) |
| G02B 15/00 | (2006.01) |
| G02B 17/00 | (2006.01) |
| G02B 25/00 | (2006.01) |

(52) U.S. Cl.
USPC .......... 359/773; 348/335; 348/345; 359/642; 359/771; 359/772

(58) Field of Classification Search
USPC ........................ 348/240.99–240.3, 335–357; 359/362–363, 642, 676–677, 683, 686, 359/694, 696–698, 754, 771, 772–773; 396/72–88, 111–120
See application file for complete search history.

(56) References Cited

U.S. PATENT DOCUMENTS

| | | | |
|---|---|---|---|
| 7,177,098 B2 * | 2/2007 | Arai | 359/715 |
| 7,274,515 B2 | 9/2007 | Noda | |
| 7,274,518 B1 * | 9/2007 | Tang et al. | 359/772 |
| 7,295,386 B2 | 11/2007 | Taniyama | |

(Continued)

FOREIGN PATENT DOCUMENTS

| | | |
|---|---|---|
| JP | 2009053592 A | 3/2009 |
| JP | 2009069194 A | 4/2009 |

(Continued)

*Primary Examiner* — Michael Osinski

(74) *Attorney, Agent, or Firm* — Baker & McKenzie LLP

(57) ABSTRACT

An imaging lens includes first, second, third, and fourth lens elements arranged from an object side to an image side in the given order. The first lens element has a positive refractive power. The second lens element has a negative refractive power, and concave object-side and image-side surfaces. The third lens element has a positive refractive power. The fourth lens has a curved object-side surface with a convex portion and a concave portion. The imaging lens satisfies AAG/CT3≥1.3, where AAG is a sum of distances between any adjacent two of the lens elements, and CT3 is a thickness of the third lens element.

19 Claims, 27 Drawing Sheets

(56) References Cited

U.S. PATENT DOCUMENTS

| | | |
|---|---|---|
| 7,365,920 B2 | 4/2008 | Noda |
| 7,443,611 B2 * | 10/2008 | Shinohara ............... 359/772 |
| 7,466,497 B2 * | 12/2008 | Park et al. ............... 359/715 |
| 7,561,347 B2 * | 7/2009 | Park et al. ............... 359/793 |
| 7,646,552 B2 * | 1/2010 | You et al. ............... 359/772 |
| 7,777,972 B1 | 8/2010 | Chen et al. |
| 7,957,079 B2 | 6/2011 | Tang |
| 8,179,470 B2 | 5/2012 | Chen et al. |
| 8,218,253 B2 * | 7/2012 | Tang ............... 359/773 |
| 8,294,997 B2 | 10/2012 | Tang et al. |
| 8,411,377 B2 * | 4/2013 | Tsai et al. ............... 359/780 |
| 8,508,648 B2 * | 8/2013 | Kubota et al. ............... 348/340 |
| 8,582,215 B2 * | 11/2013 | Chen et al. ............... 359/715 |
| 8,670,189 B2 * | 3/2014 | Tsai et al. ............... 359/715 |
| 2004/0136097 A1 * | 7/2004 | Park ............... 359/773 |
| 2005/0105194 A1 * | 5/2005 | Matsui et al. ............... 359/772 |
| 2007/0014033 A1 * | 1/2007 | Shinohara ............... 359/692 |
| 2008/0024882 A1 * | 1/2008 | Park et al. ............... 359/793 |
| 2008/0043346 A1 * | 2/2008 | Sano ............... 359/715 |
| 2008/0055742 A1 * | 3/2008 | Sato ............... 359/779 |
| 2008/0266670 A1 | 10/2008 | Liao |
| 2009/0207506 A1 * | 8/2009 | Tang et al. ............... 359/773 |
| 2009/0257133 A1 * | 10/2009 | Sano et al. ............... 359/715 |
| 2010/0097709 A1 * | 4/2010 | Tsai ............... 359/715 |
| 2011/0013069 A1 * | 1/2011 | Chen ............... 348/335 |
| 2011/0115962 A1 * | 5/2011 | Chen et al. ............... 348/335 |
| 2012/0086848 A1 * | 4/2012 | Tsai et al. ............... 348/340 |
| 2012/0127584 A1 * | 5/2012 | Kubota et al. ............... 359/686 |
| 2012/0140105 A1 | 6/2012 | Tang et al. |
| 2012/0182627 A1 * | 7/2012 | Chen ............... 359/714 |
| 2012/0229922 A1 * | 9/2012 | Kubota et al. ............... 359/774 |
| 2012/0236421 A1 * | 9/2012 | Tsai et al. ............... 359/780 |
| 2013/0148012 A1 * | 6/2013 | Yamazaki et al. ............... 348/360 |
| 2013/0250440 A1 * | 9/2013 | Ota ............... 359/715 |
| 2013/0258184 A1 * | 10/2013 | Chang et al. ............... 348/374 |
| 2013/0321920 A1 * | 12/2013 | Suzuki et al. ............... 359/566 |
| 2013/0321936 A1 * | 12/2013 | Ohashi ............... 359/740 |
| 2014/0036133 A1 * | 2/2014 | Sekine et al. ............... 348/340 |
| 2014/0055663 A1 * | 2/2014 | Chang et al. ............... 348/360 |
| 2014/0055870 A1 * | 2/2014 | Chang et al. ............... 359/715 |

FOREIGN PATENT DOCUMENTS

| | | |
|---|---|---|
| JP | 2009069195 A | 4/2009 |
| JP | 2009069196 A | 4/2009 |
| JP | 2009169005 A | 7/2009 |
| JP | 2009258286 A | 11/2009 |
| TW | I361915 | 3/1997 |

* cited by examiner

FIG. 2 system focal length =2.63mm, half field-of-view=34.05°, F-number=2.2, system length=3.21mm

| lens element | surface | radius of curvature | thickness | refractive index | Abbe number | material | focal length |
|---|---|---|---|---|---|---|---|
| object | | ∞ | 370 | | | | |
| aperture stop 2 | | ∞ | -0.12 | | | | |
| first lens element 3 | object-side surface 31 | 1.138126 | 0.5900444 | 1.535 | 55.6345 | plastic | 2.029 |
| | image-side surface 32 | -20.39926 | 0.0841103 | | | | |
| second lens element 4 | object-side surface 41 | -3.512904 | 0.1995001 | 1.632 | 23.279 | plastic | -4.012 |
| | image-side surface 42 | 9.58737 | 0.4267294 | | | | |
| third lens element 5 | object-side surface 51 | -1.090243 | 0.3439209 | 1.535 | 55.6345 | plastic | 1.801 |
| | image-side surface 52 | -0.568504 | 0.1566345 | | | | |
| fourth lens element 6 | object-side surface 61 | 1.986238 | 0.2526566 | 1.531 | 55.744 | plastic | -1.874 |
| | image-side surface 62 | 0.6350566 | 0.5 | | | | |
| Optical filter 7 | object-side surface 71 | ∞ | 0.3 | | | | |
| | image-side surface 72 | ∞ | 0.3545204 | | | | |
| Image plane 8 | | ∞ | | | | | |

| surface | 31 | 32 | 41 | 42 | 51 | 52 | 61 | 62 |
|---|---|---|---|---|---|---|---|---|
| K | -9.49E+00 | 1.43E+02 | -1.50E+02 | 1.68E+02 | 1.22E+00 | -7.83E-01 | -1.37E+01 | -5.61E+00 |
| $a_4$ | 6.97E-01 | -1.29E-01 | -3.41E-01 | 2.16E-01 | 1.43E-01 | 8.79E-01 | -2.98E-01 | -2.93E-01 |
| $a_6$ | -1.13E+00 | -9.50E-01 | -8.31E-01 | -7.99E-01 | 5.24E-01 | -1.67E+00 | 1.30E-01 | 2.36E-01 |
| $a_8$ | 1.02E+00 | -6.56E-01 | 1.04E+00 | 4.82E-01 | -7.02E+00 | 1.10E+00 | 9.53E-02 | -1.49E-01 |
| $a_{10}$ | -1.28E+00 | 2.04E+00 | -4.24E+00 | 1.91E+00 | 4.84E+01 | 3.18E+00 | -8.67E-02 | 4.99E-02 |
| $a_{12}$ | 7.44E+00 | 8.16E-01 | 7.35E+00 | -3.61E+00 | -1.87E+02 | -7.00E+00 | -4.52E-03 | 8.32E-04 |
| $a_{14}$ | -3.72E+00 | 6.66E-01 | 1.98E+01 | 8.10E-01 | 2.33E+02 | 2.20E+00 | 1.95E-02 | -7.00E-03 |
| $a_{16}$ | -5.40E+01 | 4.20E-01 | -2.63E+01 | -4.96E+00 | 6.73E+02 | 2.59E+00 | -4.80E-03 | 1.44E-03 |
| $a_{18}$ | 4.55E+01 | -3.03E+01 | 2.11E+00 | -3.82E+00 | -2.36E+03 | 1.66E+01 | 5.35E-04 | 1.83E-04 |
| $a_{20}$ | 5.22E+01 | 3.92E+01 | -1.84E+01 | 4.94E+01 | 2.02E+03 | -1.99E+01 | -1.72E-04 | -5.71E-05 |

FIG. 3

FIG. 6 system focal length =2.63mm, half field-of-view=34.04°, F-number =2.2, system length=3.18mm

| lens element | surface | radius of curvature | thickness | refractive index | Abbe number | material | focal length |
|---|---|---|---|---|---|---|---|
| object | | ∞ | 370 | | | | |
| aperture stop 2 | | ∞ | -0.12 | | | | |
| first lens element 3 | object-side surface 31 | 1.127933 | 0.5786074 | 1.535 | 55.6345 | plastic | 2.035 |
| | image-side surface 32 | -27.56515 | 0.1129478 | | | | |
| second lens element 4 | object-side surface 41 | -3.471834 | 0.1991892 | 1.632 | 23.279 | plastic | -4.027 |
| | image-side surface 42 | 10.04276 | 0.4533593 | | | | |
| third lens element 5 | object-side surface 51 | -1.081978 | 0.3311313 | 1.535 | 55.6345 | plastic | 1.803 |
| | image-side surface 52 | -0.5652367 | 0.1519573 | | | | |
| fourth lens element 6 | object-side surface 61 | 1.925309 | 0.2520139 | 1.531 | 55.744 | plastic | -1.859 |
| | image-side surface 62 | 0.6243796 | 0.5 | | | | |
| Optical filter 7 | object-side surface 71 | ∞ | 0.3 | | | | |
| | image-side surface 72 | ∞ | 0.3138454 | | | | |
| Image plane 8 | | ∞ | | | | | |

| surface | 31 | 32 | 41 | 42 | 51 | 52 | 61 | 62 |
|---|---|---|---|---|---|---|---|---|
| K | -9.45E+00 | -2.00E+02 | -1.53E+02 | 1.60E+02 | 1.11E+00 | -7.97E-01 | -1.64E+01 | -5.64E+00 |
| $a_4$ | 7.04E-01 | -1.06E-01 | -3.28E-01 | 2.13E-01 | 1.12E-01 | 8.79E-01 | -3.09E-01 | -3.13E-01 |
| $a_6$ | -1.15E+00 | -8.38E-01 | -7.36E-01 | -7.72E-01 | 5.13E-01 | -1.80E+00 | 1.46E-01 | 2.53E-01 |
| $a_8$ | 9.16E-01 | -6.71E-01 | 1.15E+00 | 5.14E-01 | -7.13E+00 | 1.09E+00 | 8.91E-02 | -1.62E-01 |
| $a_{10}$ | -1.31E+00 | 2.05E+00 | -4.03E+00 | 2.07E+00 | 4.59E+01 | 3.15E+00 | -8.93E-02 | 5.44E-02 |
| $a_{12}$ | 7.96E+00 | 7.53E-01 | 7.01E+00 | -3.61E+00 | -1.87E+02 | -7.32E+00 | -4.20E-03 | -9.97E-05 |
| $a_{14}$ | -3.53E+00 | 6.10E-01 | 1.88E+01 | 1.14E+00 | 2.60E+02 | 2.60E+00 | 2.05E-02 | -6.70E-03 |
| $a_{16}$ | -5.49E+01 | 4.27E-01 | -2.68E+01 | -5.04E+00 | 6.28E+02 | 3.00E+00 | -4.61E-03 | 1.41E-03 |
| $a_{18}$ | 4.67E+01 | -3.12E+01 | -1.26E+00 | -4.84E+00 | -2.34E+03 | 1.69E+01 | 4.45E-04 | 1.59E-04 |
| $a_{20}$ | 5.16E+01 | 3.50E+01 | -2.19E+01 | 3.96E+01 | 2.01E+03 | -2.01E+01 | -2.52E-04 | -5.55E-05 |

FIG. 7

FIG. 10 system focal length =2.68mm, half field-of-view=33.57°, F-number =2.2, system length=3.24mm

| lens element | surface | radius of curvature | thickness | refractive index | Abbe number | material | focal length |
|---|---|---|---|---|---|---|---|
| object | | ∞ | 370 | | | | |
| aperture stop 2 | | ∞ | -0.12 | | | | |
| first lens element 3 | object-side surface 31 | 1.133905 | 0.6062602 | 1.535 | 55.6345 | plastic | 2.04 |
| | image-side surface 32 | -25.24181 | 0.103949 | | | | |
| second lens element 4 | object-side surface 41 | -3.454658 | 0.2218329 | 1.632 | 23.279 | plastic | -3.965 |
| | image-side surface 42 | 9.634989 | 0.4491109 | | | | |
| third lens element 5 | object-side surface 51 | -1.093024 | 0.3346537 | 1.535 | 55.6345 | plastic | 1.795 |
| | image-side surface 52 | -0.566545 | 0.1490619 | | | | |
| fourth lens element 6 | object-side surface 61 | 1.971102 | 0.2509897 | 1.531 | 55.744 | plastic | -1.835 |
| | image-side surface 62 | 0.6246256 | 0.5 | | | | |
| Optical filter 7 | object-side surface 71 | ∞ | 0.3 | | | | |
| | image-side surface 72 | ∞ | 0.3286663 | | | | |
| Image plane 8 | | ∞ | | | | | |

| surface | 31 | 32 | 41 | 42 | 51 | 52 | 61 | 62 |
|---|---|---|---|---|---|---|---|---|
| K | -9.57E+00 | 7.66E+01 | -1.51E+02 | 1.59E+02 | 1.14E+00 | -7.97E-01 | -2.22E+01 | -6.03E+00 |
| $a_4$ | 6.92E-01 | -1.14E-01 | -3.26E-01 | 2.27E-01 | 1.30E-01 | 8.91E-01 | -3.01E-01 | -3.06E-01 |
| $a_6$ | -1.11E+00 | -8.55E-01 | -7.28E-01 | -7.30E-01 | 5.61E-01 | -1.81E+00 | 1.36E-01 | 2.51E-01 |
| $a_8$ | 9.35E-01 | -6.73E-01 | 1.16E+00 | 5.41E-01 | -7.12E+00 | 1.11E+00 | 9.14E-02 | -1.64E-01 |
| $a_{10}$ | -1.31E+00 | 2.10E+00 | -4.11E+00 | 2.08E+00 | 4.60E+01 | 3.12E+00 | -8.84E-02 | 5.45E-02 |
| $a_{12}$ | 7.86E+00 | 8.73E-01 | 7.11E+00 | -3.80E+00 | -1.87E+02 | -7.39E+00 | -3.91E-03 | 3.04E-05 |
| $a_{14}$ | -3.74E+00 | 7.69E-01 | 1.87E+01 | 8.57E-01 | 2.60E+02 | 2.55E+00 | 2.05E-02 | -6.71E-03 |
| $a_{16}$ | -5.50E+01 | 5.61E-01 | -2.68E+01 | -5.03E+00 | 6.28E+02 | 2.94E+00 | -4.72E-03 | 1.40E-03 |
| $a_{18}$ | 4.70E+01 | -3.14E+01 | -1.27E+00 | -3.83E+00 | -2.35E+03 | 1.69E+01 | 4.48E-04 | 1.62E-04 |
| $a_{20}$ | 5.38E+01 | 3.41E+01 | -2.11E+01 | 4.44E+01 | 2.00E+03 | -2.01E+01 | -2.47E-04 | -5.63E-05 |

FIG. 11

FIG. 14 system focal length =2.63mm, half field-of-view=33.62°, F-number =2.2, system length=3.22mm

| lens element | surface | radius of curvature | thickness | refractive index | Abbe number | material | focal length |
|---|---|---|---|---|---|---|---|
| object | | ∞ | 370 | | | | |
| aperture stop 2 | | ∞ | -0.12 | | | | |
| first lens element 3 | object-side surface 31 | 1.158377 | 0.4616374 | 1.535 | 55.6345 | plastic | 1.829 |
| | image-side surface 32 | -5.502256 | 0.082232 | | | | |
| second lens element 4 | object-side surface 41 | -3.234149 | 0.2757345 | 1.632 | 23.279 | plastic | -3.765 |
| | image-side surface 42 | 9.596071 | 0.4059191 | | | | |
| third lens element 5 | object-side surface 51 | -1.158191 | 0.4608011 | 1.535 | 55.635 | plastic | 2.126 |
| | image-side surface 52 | -0.654354 | 0.1272948 | | | | |
| fourth lens element 6 | object-side surface 61 | 1.539486 | 0.3020827 | 1.531 | 55.744 | plastic | -2.053 |
| | image-side surface 62 | 0.5959764 | 0.5 | | | | |
| Optical filter 7 | object-side surface 71 | ∞ | 0.3 | | | | |
| | image-side surface 72 | ∞ | 0.3055882 | | | | |
| Image plane 8 | | ∞ | | | | | |

| surface | 31 | 32 | 41 | 42 | 51 | 52 | 61 | 62 |
|---|---|---|---|---|---|---|---|---|
| K | -9.19E+00 | 3.34E+01 | -1.05E+02 | 1.60E+02 | -2.02E+01 | -2.20E+00 | -6.38E+01 | -6.18E+00 |
| $a_4$ | 6.29E-01 | 3.61E-01 | 4.05E-01 | 6.06E-01 | -5.21E-01 | -1.30E-01 | -4.72E-01 | -3.89E-01 |
| $a_6$ | -1.02E+00 | -1.02E+00 | -1.06E+00 | -9.31E-01 | -2.26E-01 | -2.17E-01 | 2.32E-01 | 3.70E-01 |
| $a_8$ | 7.83E-01 | -9.01E-01 | -1.61E-01 | 2.82E-01 | 2.84E+00 | 2.09E-01 | 8.79E-02 | -2.93E-01 |
| $a_{10}$ | 3.10E-01 | 1.12E+00 | -3.44E+00 | 9.53E-01 | 5.18E-01 | -6.50E-01 | -8.12E-02 | 1.57E-01 |
| $a_{12}$ | -1.41E+00 | 1.63E-01 | 7.95E+00 | -3.32E+00 | -4.08E+01 | 2.10E-01 | -3.98E-03 | -5.05E-02 |
| $a_{14}$ | -6.68E-01 | 5.76E+00 | 1.76E+01 | 1.14E+01 | 1.13E+02 | 4.32E+00 | 2.15E-02 | 7.43E-03 |
| $a_{16}$ | -6.94E+00 | -1.58E+01 | -4.11E+01 | -1.61E+01 | -9.64E+01 | -3.78E+00 | -5.12E-03 | -5.34E-04 |
| $a_{18}$ | | | | | | | -1.60E-04 | 1.93E-04 |
| $a_{20}$ | | | | | | | -2.28E-04 | 3.33E-05 |

| system focal length =2.66mm, half field-of-view=35.61°, F-number =2.2, system length=3.22mm | | | | | | |
|---|---|---|---|---|---|---|
| lens element | surface | radius of curvature | thickness | refractive index | Abbe number | material | focal length |
| object | | ∞ | 370 | | | | |
| aperture stop 2 | | ∞ | -0.12 | | | | |
| first lens element 3 | object-side surface 31 | 1.156089 | 0.4693926 | 1.535 | 55.635 | plastic | 1.833 |
| | image-side surface 32 | -5.626676 | 0.07906447 | | | | |
| second lens element 4 | object-side surface 41 | -3.164406 | 0.2695354 | 1.632 | 23.279 | plastic | -3.744 |
| | image-side surface 42 | 10.00222 | 0.3938406 | | | | |
| third lens element 5 | object-side surface 51 | -1.119587 | 0.4535497 | 1.535 | 55.635 | plastic | 2.106 |
| | image-side surface 52 | -0.6417651 | 0.1257823 | | | | |
| fourth lens element 6 | object-side surface 61 | 1.519771 | 0.3027666 | 1.531 | 55.744 | plastic | -2.059 |
| | image-side surface 62 | 0.5931184 | 0.5 | | | | |
| Optical filter 7 | object-side surface 71 | ∞ | 0.3 | | | | |
| | image-side surface 72 | ∞ | 0.3055882 | | | | |
| Image plane 8 | | ∞ | | | | | |

| surface | 31 | 32 | 41 | 42 | 51 | 52 | 61 | 62 |
|---|---|---|---|---|---|---|---|---|
| K | -8.50E+00 | 3.61E+01 | -7.11E+01 | -8.90E+00 | -2.18E+01 | -2.43E+00 | -6.43E+01 | -6.36E+00 |
| $a_4$ | 6.28E-01 | 3.37E-01 | 3.63E-01 | 5.79E-01 | -6.10E-01 | -1.43E-01 | -3.91E-01 | -3.73E-01 |
| $a_6$ | -1.00E+00 | -9.64E-01 | -1.14E+00 | -1.27E+00 | -1.87E-01 | -2.14E-01 | 2.31E-01 | 3.70E-01 |
| $a_8$ | 8.59E-01 | -7.39E-01 | -1.05E-01 | 6.24E-01 | 2.93E+00 | 3.46E-01 | 7.80E-02 | -2.94E-01 |
| $a_{10}$ | 4.23E-01 | 1.29E+00 | -2.86E+00 | 1.74E+00 | -4.33E-02 | -5.75E-01 | -8.67E-02 | 1.56E-01 |
| $a_{12}$ | -1.35E+00 | 8.96E-02 | 9.19E+00 | -3.99E+00 | -4.21E+01 | 8.47E-03 | -5.78E-03 | -5.01E-02 |
| $a_{14}$ | -7.19E-01 | 5.09E+00 | 1.80E+01 | 9.38E+00 | 1.12E+02 | 3.97E+00 | 2.12E-02 | 7.85E-03 |
| $a_{16}$ | -6.04E+00 | -1.68E+01 | -4.82E+01 | -1.21E+01 | -9.23E+01 | -3.39E+00 | -5.13E-03 | -3.17E-04 |
| $a_{18}$ | | | | | | | -3.37E-05 | 2.06E-04 |
| $a_{20}$ | | | | | | | 2.70E-05 | -7.97E-05 |

| system focal length =2.63mm, half field-of-view=35.62°, F-number =2.2, system length=3.47mm | | | | | | |
|---|---|---|---|---|---|---|
| lens element | surface | radius of curvature | thickness | refractive index | Abbe number | material | focal length |
| object | | ∞ | 370 | | | | |
| aperture stop 2 | | ∞ | -0.12 | | | | |
| first lens element 3 | object-side surface 31 | 1.434879 | 0.7752983 | 1.535 | 55.635 | plastic | 2.021 |
| | image-side surface 32 | -3.59369 | 0.08096093 | | | | |
| second lens element 4 | object-side surface 41 | -2.974959 | 0.2996826 | 1.632 | 23.279 | plastic | -3.552 |
| | image-side surface 42 | 9.821256 | 0.2567757 | | | | |
| third lens element 5 | object-side surface 51 | -1.788133 | 0.3652983 | 1.535 | 55.635 | plastic | 4.925 |
| | image-side surface 52 | -1.142265 | 0.1408041 | | | | |
| fourth lens element 6 | object-side surface 61 | 1.020025 | 0.3571193 | 1.531 | 55.744 | plastic | -8.512 |
| | image-side surface 62 | 0.731401 | 0.5 | | | | |
| Optical filter 7 | object-side surface 71 | ∞ | 0.3 | | | | |
| | image-side surface 72 | ∞ | 0.3921492 | | | | |
| Image plane 8 | | ∞ | | | | | |

| surface | 31 | 32 | 41 | 42 | 51 | 52 | 61 | 62 |
|---|---|---|---|---|---|---|---|---|
| K | -2.16E+01 | 2.18E+01 | 8.18E+00 | 1.61E+02 | -7.43E+00 | -3.14E+00 | -2.45E+00 | -2.95E+00 |
| $a_4$ | 6.48E-01 | -1.88E-01 | -1.98E-01 | 4.92E-02 | 8.74E-01 | 2.94E-01 | -4.92E-01 | -3.24E-01 |
| $a_6$ | -1.36E+00 | -1.93E-01 | -6.87E-01 | -4.99E-01 | -3.03E+00 | -2.12E-01 | 2.96E-01 | 3.04E-01 |
| $a_8$ | 9.08E-01 | 4.80E-01 | 3.03E+00 | 2.54E-02 | 4.60E+00 | -1.19E-01 | -9.92E-02 | -2.87E-01 |
| $a_{10}$ | 1.66E+00 | 1.92E+00 | -8.90E-01 | 1.09E+00 | 4.09E+00 | -6.15E-01 | -6.94E-02 | 1.63E-01 |
| $a_{12}$ | -1.29E+00 | -2.76E-01 | -2.64E-01 | -2.16E+00 | -4.84E+01 | -4.68E-01 | 3.39E-02 | -4.81E-02 |
| $a_{14}$ | -5.41E+00 | -1.23E+00 | 3.51E+00 | 1.34E+01 | 9.83E+01 | 3.97E+00 | 3.48E-02 | 5.76E-03 |
| $a_{16}$ | 4.69E+00 | -7.01E+00 | -1.57E+01 | -1.79E+01 | -6.23E+01 | -2.74E+00 | 6.49E-03 | -1.48E-03 |
| $a_{18}$ | | | | | | | -2.39E-02 | 8.69E-04 |
| $a_{20}$ | | | | | | | 6.54E-03 | -1.03E-04 |

FIG. 23

| relationship | first preferred embodiment | second preferred embodiment | third preferred embodiment | fourth preferred embodiment | fifth preferred embodiment | sixth preferred embodiment |
|---|---|---|---|---|---|---|
| CT1 | 0.59 | 0.58 | 0.61 | 0.46 | 0.47 | 0.78 |
| CT2 | 0.20 | 0.20 | 0.22 | 0.28 | 0.27 | 0.30 |
| CT3 | 0.34 | 0.33 | 0.33 | 0.46 | 0.45 | 0.37 |
| CT4 | 0.25 | 0.25 | 0.25 | 0.30 | 0.30 | 0.36 |
| AC12 | 0.08 | 0.11 | 0.10 | 0.08 | 0.08 | 0.08 |
| AC34 | 0.16 | 0.15 | 0.15 | 0.13 | 0.13 | 0.14 |
| AAG | 0.67 | 0.72 | 0.70 | 0.61 | 0.60 | 0.48 |
| EFL | 2.63 | 2.63 | 2.68 | 2.63 | 2.66 | 2.63 |
| AAG/CT3 | 1.94 | 2.17 | 2.09 | 1.33 | 1.32 | 1.3 |
| EFL/CT3 | 7.65 | 7.94 | 8.02 | 5.7 | 5.8 | 7.2 |
| (AC12+AC34)/CT2 | 1.21 | 1.33 | 1.14 | 0.76 | 0.76 | 0.74 |
| AAG/CT2 | 3.34 | 3.61 | 3.16 | 2.23 | 2.22 | 1.6 |
| CT3/CT2 | 1.72 | 1.66 | 1.51 | 1.67 | 1.68 | 1.22 |
| CT1−CT3 | 0.25 | 0.25 | 0.27 | 0.001 | 0.015 | 0.41 |
| CT3+CT4 | 0.60 | 0.58 | 0.59 | 0.76 | 0.76 | 0.72 |
| CT3/AC12 | 4.10 | 2.93 | 3.22 | 5.62 | 5.75 | 4.51 |

FIG. 25

IMAGING LENS AND PORTABLE ELECTRONIC APPARATUS HAVING THE SAME

CROSS-REFERENCE TO RELATED APPLICATION

This application claims priority to Chinese Application No. 201210458537.3, filed on Nov. 15, 2012.

BACKGROUND OF THE INVENTION

1. Field of the Invention

The present invention relates to an imaging lens and a portable electronic apparatus having the same.

2. Description of the Related Art

In recent years, as use of portable electronic devices (e.g., mobile phones and digital cameras) becomes ubiquitous, much effort has been put into reducing dimensions of portable electronic devices. Moreover, as dimensions of charged coupled device (CCD) and complementary metal-oxide semiconductor (CMOS) based optical sensors are reduced, dimensions of imaging lenses for use with the optical sensors must be correspondingly reduced without significantly compromising optical performance.

U.S. Pat. No. 7,295,386 discloses a conventional imaging lens with four lens elements. In one of the disclosed embodiments, a distance between an object-side surface of a first lens element and an imaging plane thereof at an optical axis is 4.54 mm, and the longer focal length (f=5.57 mm) is unfavorable for reduction of the system length.

U.S. Pat. No. 7,365,920 discloses a conventional imaging lens with four lens elements. A distance between an object-side surface of a first lens element and an imaging plane thereof at an optical axis is 5.22 mm.

Japanese patent application publication no. 2009069196 discloses a conventional imaging lens with four lens elements. A distance between a first lens element and an imaging plane thereof at an optical axis is 4.95 mm.

U.S. patent application publication no. 20080266670 discloses a conventional imaging lens. A distance between a first lens element and an imaging plane thereof at an optical axis is 10.869 mm.

The aforementioned conventional imaging lenses go against the trend toward reducing dimension of the mobile phones due to their longer system lengths.

SUMMARY OF THE INVENTION

Therefore, an object of the present invention is to provide an imaging lens having a shorter overall length while maintaining good optical performance.

According to one aspect of the present invention, an imaging lens comprises first, second, third, and fourth lens elements arranged from an object side to an image side in the given order. Each of the first, second, third, and fourth lens elements has an object-side surface facing toward the object side and an image-side surface facing toward the image side.

The first lens element has a positive refractive power.

The second lens element has a negative refractive power. The object-side surface of the second lens element is a concave surface, and the image-side surface of the second lens element is a concave surface.

The third lens element has a positive refractive power.

The object-side surface of the fourth lens element is a curved surface and has a convex portion in a vicinity of an optical axis of the imaging lens, and a concave portion in a vicinity of a periphery of the fourth lens element.

The imaging lens satisfies AAG/CT3≥1.3, where AAG represents a sum of a distance between the image-side surface of the first lens element and the object-side surface of the second lens element at the optical axis, a distance between the image-side surface of the second lens element and the object-side surface of the third lens element at the optical axis, and a distance between the image-side surface of the third lens element and the object-side surface of the fourth lens element at the optical axis, and CT3 represents a distance between the object-side surface and the image-side surface of the third lens element at the optical axis.

The imaging lens does not include any lens element with refractive power other than the first, second, third, and fourth lens elements.

Another object of the present invention is to provide a portable electronic apparatus having an imaging lens with four lens elements.

According to another aspect of the present invention, an electronic apparatus includes a housing and an imaging module. The imaging module is disposed in the housing, and includes the imaging lens of the present invention, a barrel on which the imaging lens is disposed, a seat unit on which the barrel is disposed, and an image sensor disposed at the image side and operatively associated with the imaging lens for capturing images.

BRIEF DESCRIPTION OF THE DRAWINGS

Other features and advantages of the present invention will become apparent in the following detailed description of the preferred embodiments with reference to the accompanying drawings, of which:

FIG. 2 shows values of some optical parameters corresponding to the imaging lens of the first preferred embodiment;

FIG. 3 shows values of some parameters of an optical relationship corresponding to the imaging lens of the first preferred embodiment;

FIG. 6 shows values of some optical parameters corresponding to the imaging lens of the second preferred embodiment;

FIG. 7 shows values of some parameters of an optical relationship corresponding to the imaging lens of the second preferred embodiment;

FIG. 10 shows values of some optical parameters corresponding to the imaging lens of the third preferred embodiment;

FIG. 11 shows values of some parameters of an optical relationship corresponding to the imaging lens of the third preferred embodiment;

FIG. 14 shows values of some optical parameters corresponding to the imaging lens of the fourth preferred embodiment;

FIG. 15 shows values of some parameters of an optical relationship corresponding to the imaging lens of the fourth preferred embodiment;

FIG. 18 shows values of some optical parameters corresponding to the imaging lens of the fifth preferred embodiment;

FIG. 19 shows values of some parameters of an optical relationship corresponding to the imaging lens of the fifth preferred embodiment;

FIG. 22 shows values of some optical parameters corresponding to the imaging lens of the sixth preferred embodiment;

FIG. 23 shows values of some parameters of an optical relationship corresponding to the imaging lens of the sixth preferred embodiment;

FIG. 25 is a table that lists values of parameters of other optical relationships corresponding to the imaging lenses of the first to sixth preferred embodiments;

DETAILED DESCRIPTION OF THE PREFERRED EMBODIMENTS

Figure 1:
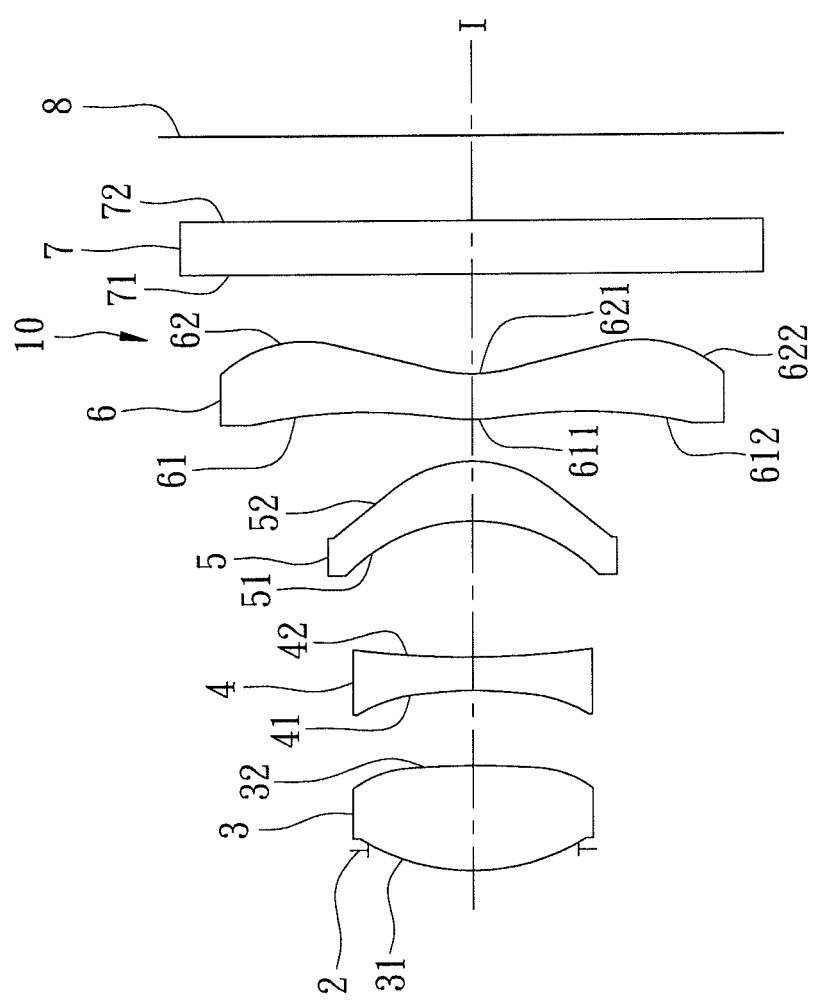
FIG. 1 is a schematic diagram that illustrates the first preferred embodiment of an imaging lens according to the present invention.

Before the present invention is described in greater detail, it should be noted that like elements are denoted by the same reference numerals throughout the disclosure.

Referring to FIG. 1, the first preferred embodiment of an imaging lens 10 according to the present invention includes an aperture stop 2, first, second, third, and fourth lens elements 3-6, and an optical filter 7 arranged in the given order along an optical axis (I) from an object side to an image side. The optical filter 7 is an infrared cut filter for selectively absorbing infrared light to thereby reduce imperfection of images formed at an image plane 8.

Each of the first, second, third, and fourth lens elements 3-6 and the optical filter 7 has an object-side surface 31, 41, 51, 61, 71 facing toward the object side, and an image-side surface 32, 42, 52, 62, 72 facing toward the image side. Light entering the imaging lens 10 travels through the aperture stop 2, the object-side and image-side surfaces 31, 32 of the first lens element 3, the object-side and image-side surfaces 41, 42 of the second lens element 4, the object-side and image-side surfaces 51, 52 of the third lens element 5, the object-side and image-side surfaces 61, 62 of the fourth lens element 6, and the object-side and image-side surfaces 71, 72 of the optical filter 7, in the given order, to form an image on the image plane 8. Each of the object-side surfaces 31, 41, 51, 61 and the image-side surfaces 32, 42, 52, 62 is aspherical and has a center point coinciding with the optical axis (I).

During manufacture, the first lens element 3 may be formed with a peripheral extending portion, which may be flat or stepped in shape. In terms of function, while the object-side and image-side surfaces 31, 32 are configured to enable passage of light through the first lens element 3, the extending portion merely serves to provide the function of installation and does not contribute toward passage of light through the first lens element 3. The other lens elements 4-6 may also be formed with extending portions similar to that of the first lens element 3.

The lens elements 3-6 are made of plastic material in this embodiment, and at least one of them may be made of other materials in other embodiments.

In the first preferred embodiment, which is depicted in FIG. 1, the first lens element 3 has a positive refractive power, the object-side surface 31 thereof is a convex surface, and the image-side surface 32 thereof is a convex surface.

The second lens element 4 has a negative refractive power, the object-side surface 41 thereof is a concave surface, and the image-side surface 42 thereof is a concave surface.

The third lens element 5 has a positive refractive power, the object-side surface 51 thereof is a concave surface, and the image-side surface 52 thereof is a convex surface.

The fourth lens element 6 has a negative refractive power, the object-side surface 61 thereof is a curved surface that has a convex portion 611 in a vicinity of the optical axis (I) and a concave portion 612 in a vicinity of a periphery of the fourth lens element 6, and the image-side surface 62 thereof is a curved surface that has a concave portion 621 in a vicinity of the optical axis (I) and a convex portion 622 in a vicinity of the periphery of the fourth lens element 6.

Shown in FIG. 2 is a table that lists values of some optical parameters corresponding to the surfaces 31-61, 32-62 of the first preferred embodiment. The imaging lens 10 has an overall system effective focal length (EFL) of 2.63 mm, a half field-of-view (HFOV) of 34.05°, an F-number of 2.2, and a system length of 3.21 mm. The system length refers to a distance between the object-side surface 31 of the first lens element 3 and the image plane 8.

In this embodiment, each of the object-side surfaces 31-61 and the image-side surfaces 32-62 is aspherical, and satisfies the optical relationship of $$Z(Y) = \frac{Y^2}{R} \bigg/ \left(1 + \sqrt{1-(1+K)\frac{Y^2}{R^2}}\right) + \sum_{i=1}^{n} a_{2i} \times Y^{2i} \quad (1)$$

where:

R represents a radius of curvature of the aspherical surface;

Z represents a depth of an aspherical surface, which is defined as a perpendicular distance between an arbitrary point on the aspherical surface that is spaced apart from the optical axis (I) by a distance Y, and a tangent plane at a vertex of the aspherical surface at the optical axis (I);

Y represents a perpendicular distance between the arbitrary point on the aspherical surface and the optical axis (I);

K represents a conic constant; and $a_{2i}$ represents a $2i^{th}$ aspherical coefficient.

Shown in FIG. 3 is a table that lists values of some optical parameters of the aforementioned optical relationship (1) corresponding to the first preferred embodiment.

Relationships among some of the aforementioned optical parameters corresponding to the first preferred embodiment are as follows:

$AAG/CT3=1.94$ $EFL/CT3=7.65$ $(AC12+AC34)/CT2=1.21$ $AAG/CT2=3.34$ $CT3/CT2=1.72$ $CT1-CT3=0.25$ mm $CT3+CT4=0.60$ mm $CT3/AC12=4.1$ where:

CT1 represents a distance between the object-side surface 31 and the image-side surface 32 of the first lens element 3 at the optical axis (I);

CT2 represents a distance between the object-side surface 41 and the image-side surface 42 of the second lens element 4 at the optical axis (I);

CT3 represents a distance between the object-side surface 51 and the image-side surface 52 of the third lens element 5 at the optical axis (I);

CT4 represents a distance between the object-side surface 61 and the image-side surface 62 of the fourth lens element 6 at the optical axis (I);

AAG represents a sum of a distance between the image-side surface 32 of the first lens element 3 and the object-side surface 41 of the second lens element 4 at the optical axis (I), a distance between the image-side surface 42 of the second lens element 4 and the object-side surface 51 of the third lens element 5 at the optical axis (I), and a distance between the image-side surface 52 of the third lens element 5 and the object-side surface 61 of the fourth lens element 6 at the optical axis (I);

EFL (effective focal length) represents a system focal length of the imaging lens 10;

AC12 represents the distance between the image-side surface 32 of the first lens element 3 and the object-side surface 41 of the second lens element 4 at the optical axis (I); and AC34 represents the distance between the image-side surface 52 of the third lens element 5 and the object-side surface 61 of the fourth lens element 6 at the optical axis (I).

FIGS. 4(a) to 4(d) show simulation results corresponding to longitudinal spherical aberration, sagittal astigmatism aberration, tangential astigmatism aberration, and distortion aberration of the first preferred embodiment, respectively. In each of the simulation results, curves corresponding respectively to wavelengths of 470 nm, 555 nm, and 650 nm are shown.

Figure 4:
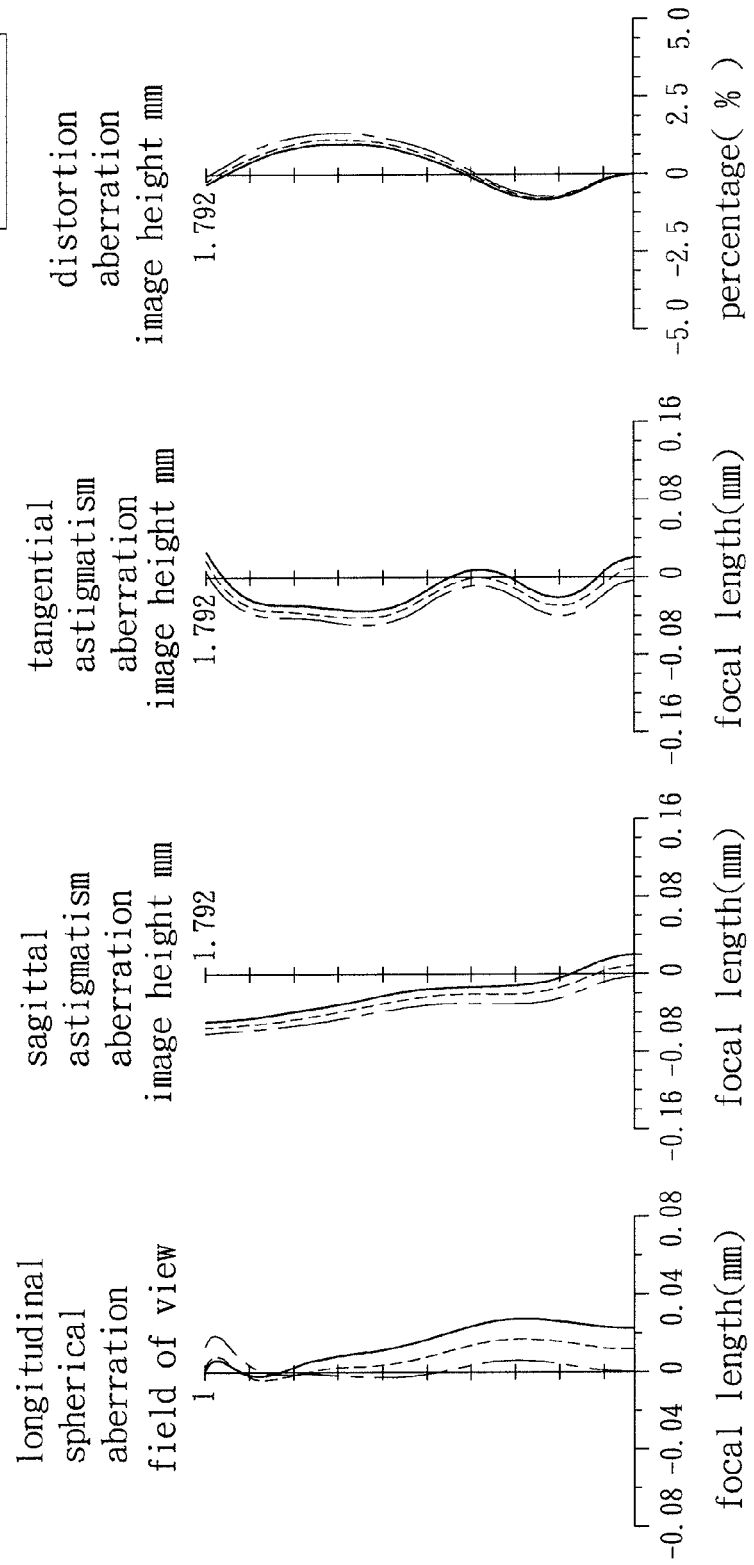
FIGS. 4(a) to 4(d) show different optical characteristics of the imaging lens of the first preferred embodiment.

It can be understood from FIG. 4(a) that, since each of the curves corresponding to longitudinal spherical aberration has a focal length at each field of view (indicated by the vertical axis) that falls within the range of ±0.03 mm, the first preferred embodiment is able to achieve a relatively low spherical aberration at each of the wavelengths. Furthermore, since a deviation in focal length among the curves at each field of view does not exceed the range of ±0.015 mm, the first preferred embodiment has a relatively low chromatic aberration.

It can be understood from FIGS. 4(b) and 4(c) that, since each of the curves falls within the range of ±0.08 mm of focal length, and since each of the curves corresponding to tangential astigmatism aberration falls within the range of ±0.05 mm of focal length, the first preferred embodiment has a relatively low optical aberration.

Moreover, as shown in FIG. 4(d), since each of the curves corresponding to distortion aberration falls within the range of ±1.5%, the first preferred embodiment is able to meet requirements in imaging quality of most optical systems.

In view of the above, even with the system length reduced down to 3.21 mm, the imaging lens 10 of the first preferred embodiment is still able to achieve a relatively good optical performance.

Figure 5:
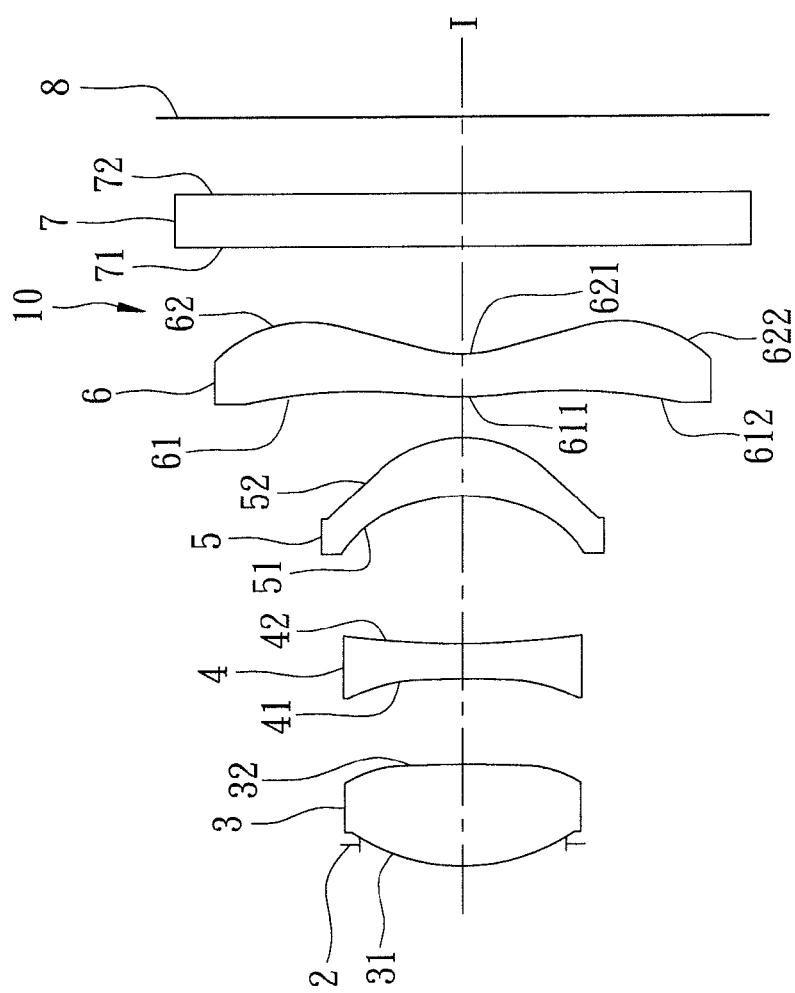
FIG. 5 is a schematic diagram that illustrates the second preferred embodiment of an imaging lens according to the present invention.
Figure 8:
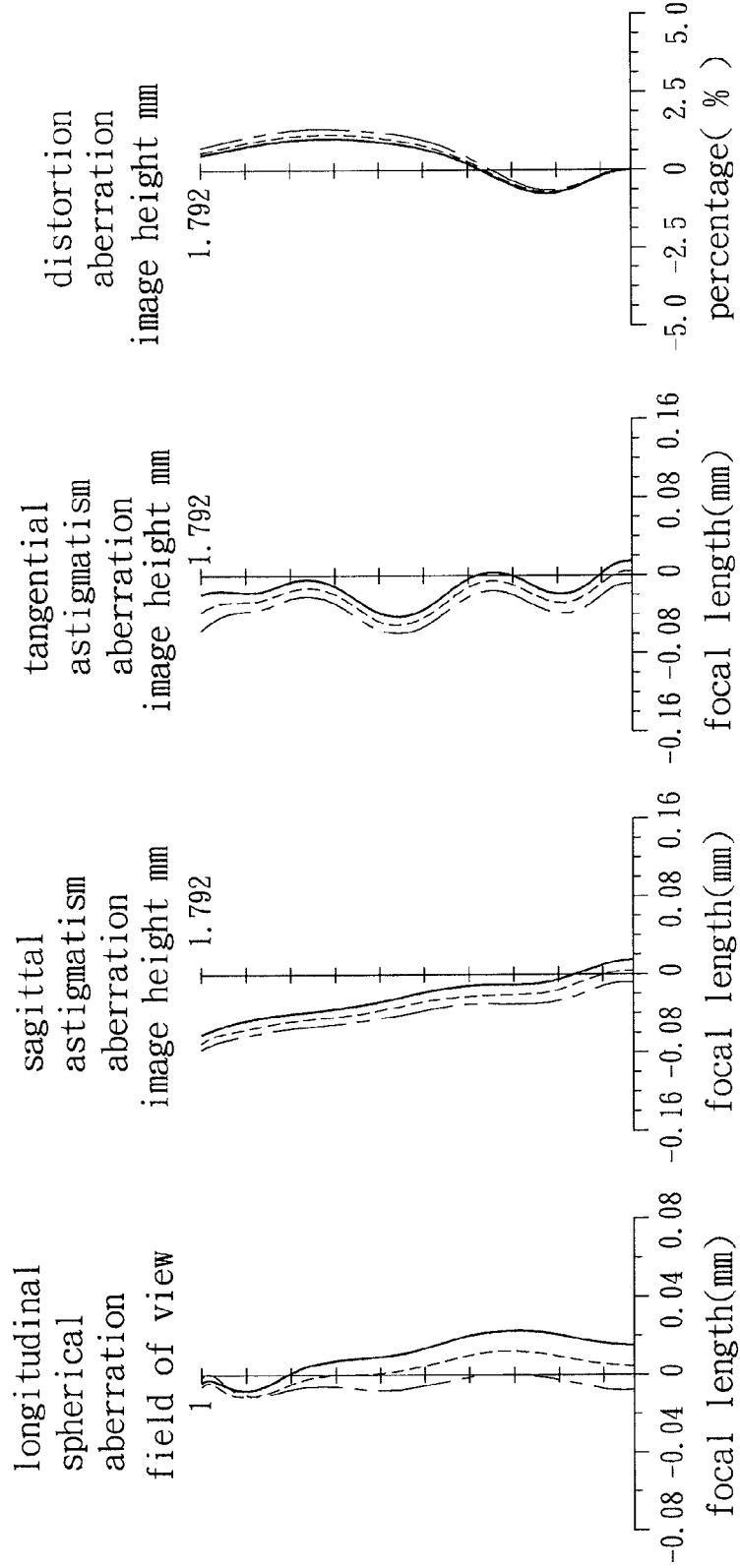
FIGS. 8(a) to 8(d) show different optical characteristics of the imaging lens of the second preferred embodiment.

FIG. 5 illustrates the second preferred embodiment of an imaging lens 10 according to the present invention, which has a configuration similar to the first preferred embodiment.

Shown in FIG. 6 is a table that lists values of some optical parameters corresponding to the surfaces 31-61, 32-62 of the second preferred embodiment. The imaging lens 10 has an overall system focal length of 2.63 mm, an HFOV of 34.04°, an F-number of 2.2, and a system length of 3.18 mm.

Shown in FIG. 7 is a table that lists values of some optical parameters of the aforementioned optical relationship (1) corresponding to the second preferred embodiment.

Relationships among some of the aforementioned optical parameters corresponding to the second preferred embodiment are as follows:

$AAG/CT3=2.17$ $EFL/CT3=7.94$ $(AC12+AC34)/CT2=1.33$ $AAG/CT2=3.61$ $CT3/CT2=1.66$ $CT1-CT3=0.25$ mm $CT3+CT4=0.58$ mm $CT3/AC12=2.93$

FIGS. 8(a) to 8(d) show simulation results corresponding to longitudinal spherical aberration, sagittal astigmatism aberration, tangential astigmatism aberration, and distortion aberration of the second preferred embodiment, respectively. It can be understood from FIGS. 8(a), 8(b), 8(c) and 8(d) that the second preferred embodiment is able to achieve a relatively good optical performance even with the system length reduced down to 3.18 mm.

Figure 9:
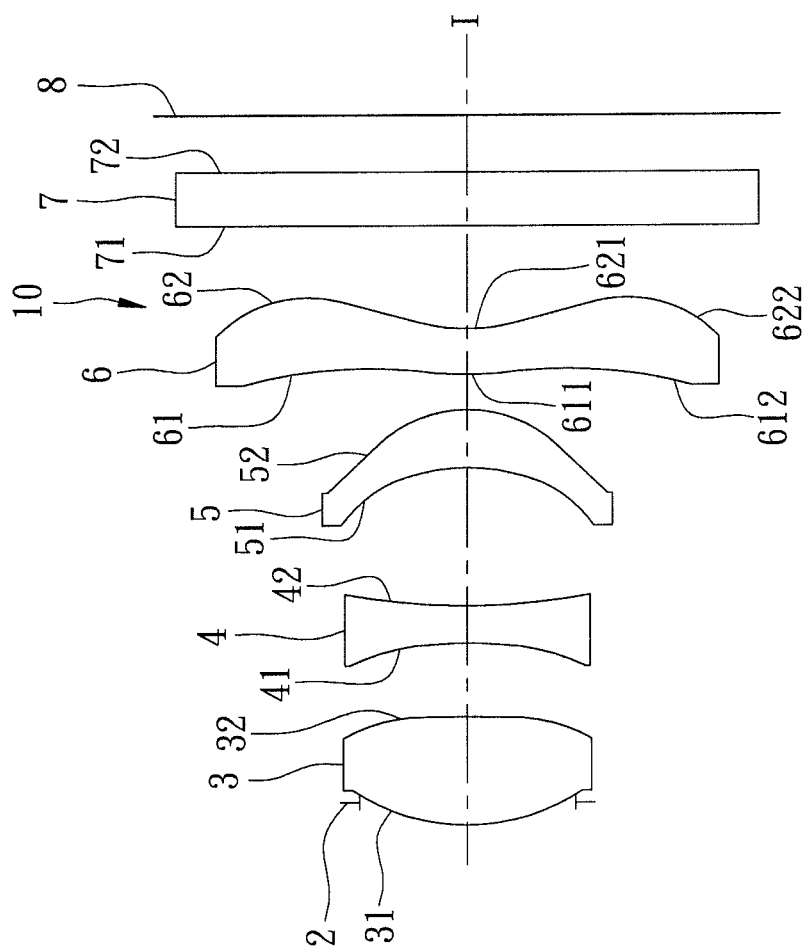
FIG. 9 is a schematic diagram that illustrates the third preferred embodiment of an imaging lens according to the present invention.
Figure 12:
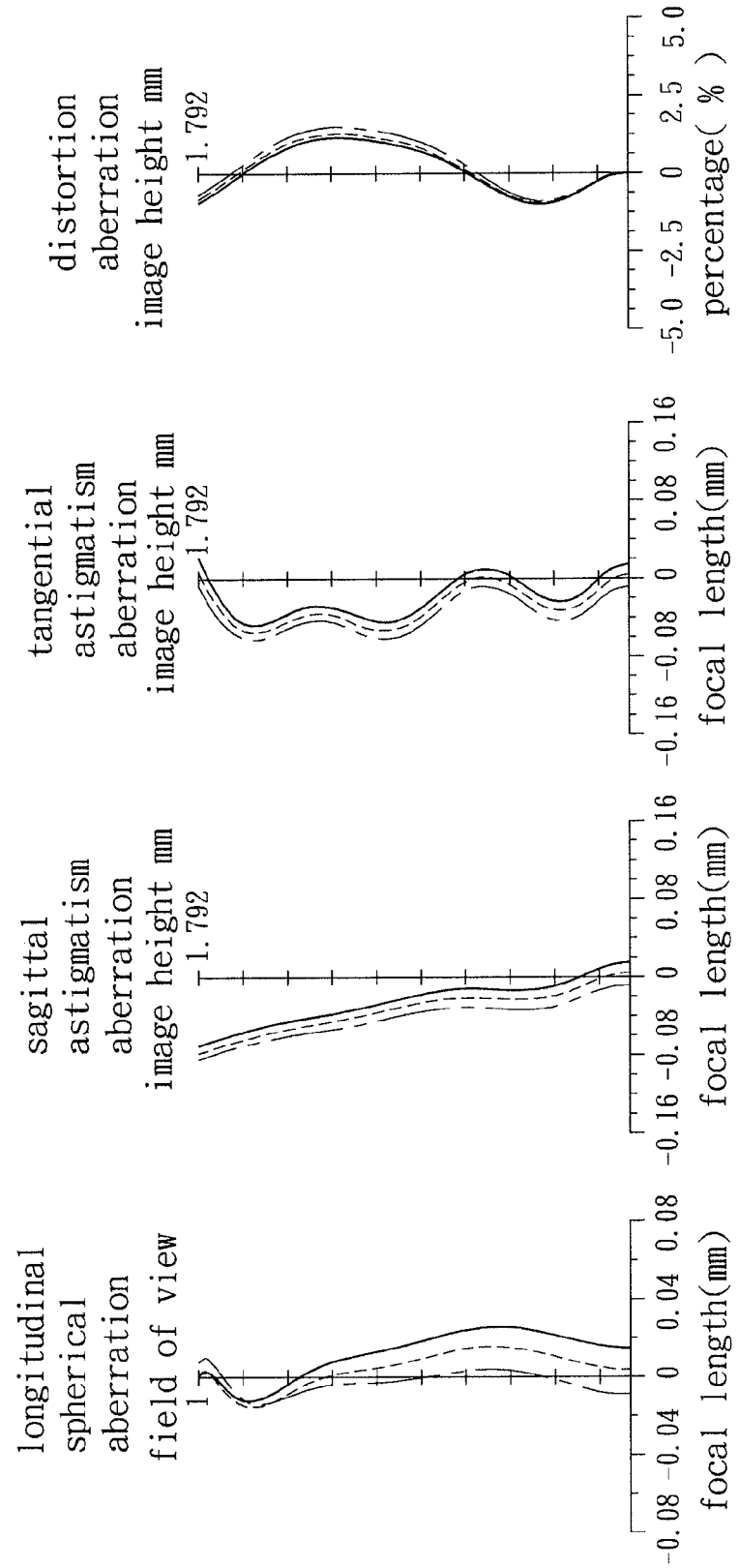
FIGS. 12(a) to 12(d) show different optical characteristics of the imaging lens of the third preferred embodiment.

FIG. 9 illustrates the third preferred embodiment of an imaging lens 10 according to the present invention, which has a configuration similar to the first preferred embodiment.

Shown in FIG. 10 is a table that lists values of some optical parameters corresponding to the surfaces 31-61, 32-62 of the third preferred embodiment. The imaging lens 10 has an overall system focal length of 2.68 mm, an HFOV of 33.57°, an F-number of 2.2, and a system length of 3.24 mm.

Shown in FIG. 11 is a table that lists values of some optical parameters of the aforementioned optical relationship (1) corresponding to the third preferred embodiment.

Relationships among some of the aforementioned optical parameters corresponding to the third preferred embodiment are as follows:

AAG/CT3=2.09

EFL/CT3=8.02

(AC12+AC34)/CT2=1.14

AAG/CT2=3.16

CT3/CT2=1.51

CT1−CT3=0.27 mm

CT3+CT4=0.59 mm

CT3/AC12=3.22

FIGS. 12(a) to 12(d) show simulation results corresponding to longitudinal spherical aberration, sagittal astigmatism aberration, tangential astigmatism aberration, and distortion aberration of the third preferred embodiment, respectively. It can be understood from FIGS. 12(a), 12(b), 12(c) and 12(d) that the third preferred embodiment is likewise able to achieve a relatively good optical performance even with the system length reduced down to 3.24 mm.

Figure 13:
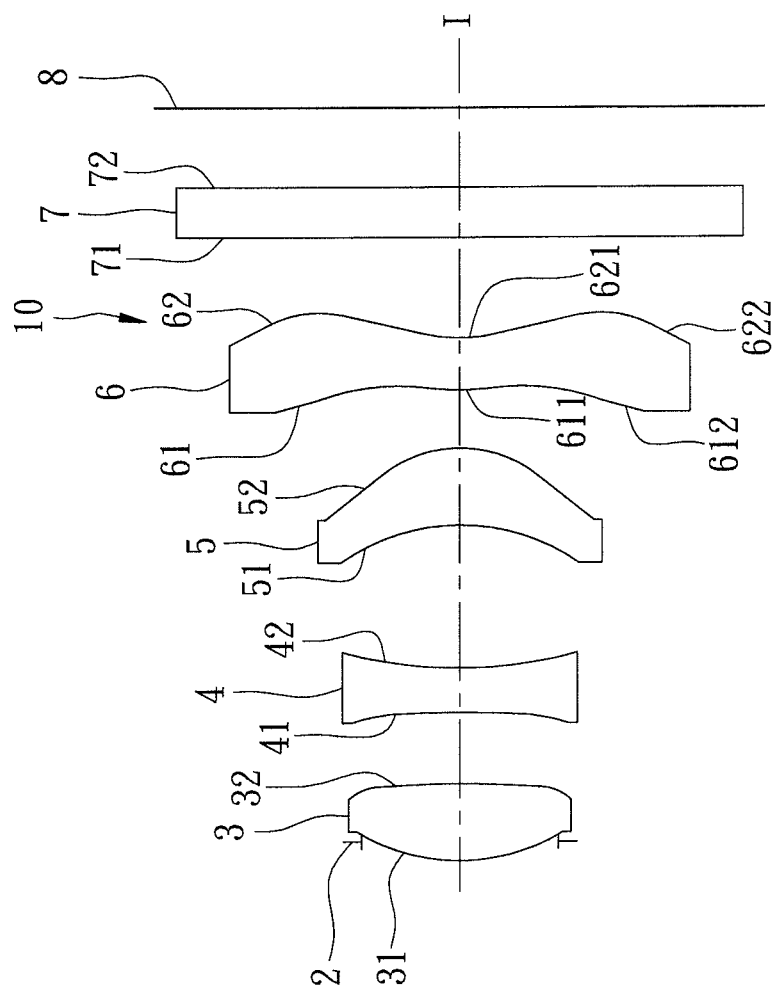
FIG. 13 is a schematic diagram that illustrates the fourth preferred embodiment of an imaging lens according to the present invention.
Figures 16A, 16B, 16C, 16D:
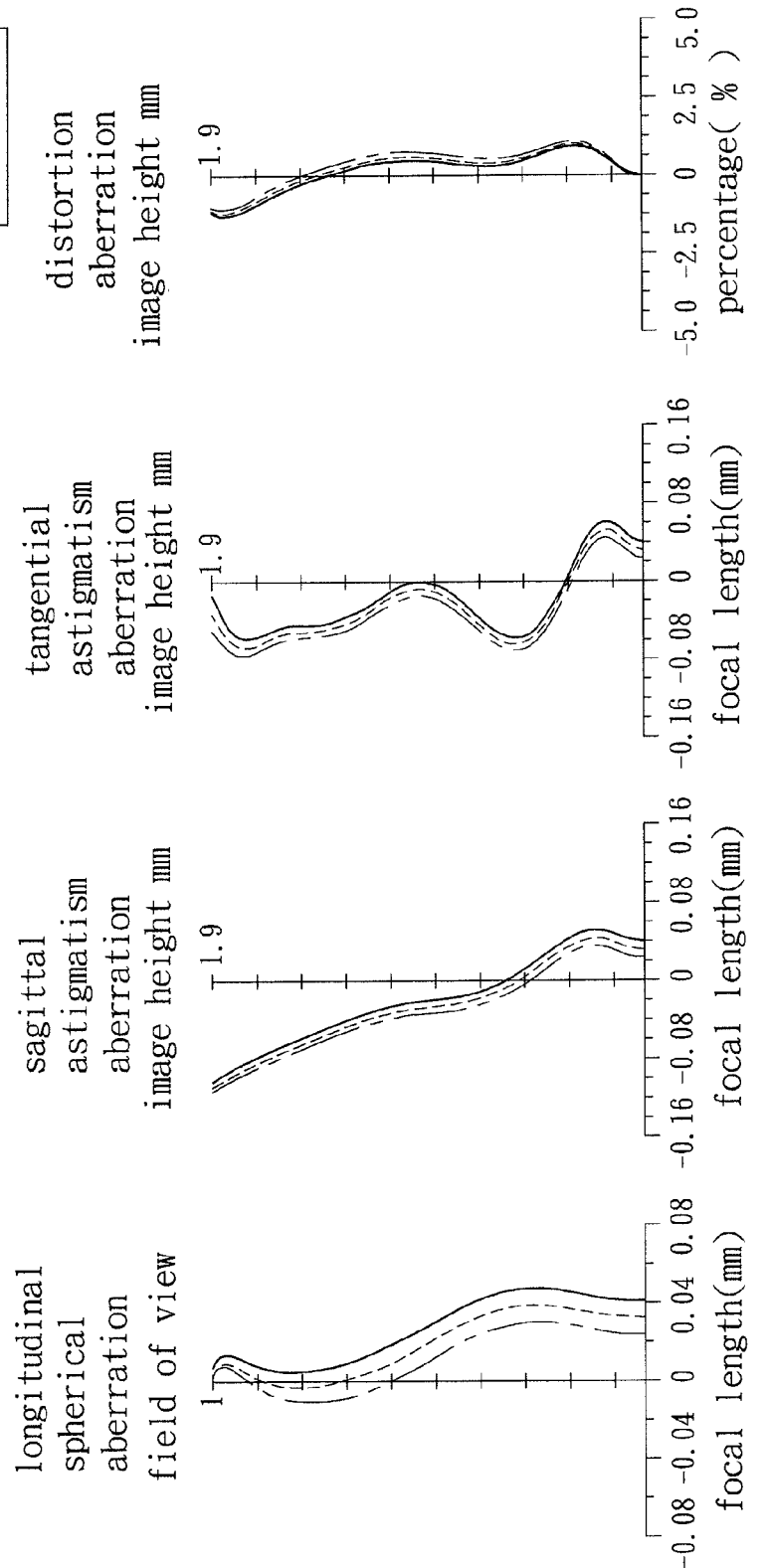
FIGS. 16(a) to 16(d) show different optical characteristics of the imaging lens of the fourth preferred embodiment.

FIG. 13 illustrates the fourth preferred embodiment of an imaging lens 10 according to the present invention, which has a configuration similar to the first preferred embodiment.

Shown in FIG. 14 is a table that lists values of some optical parameters corresponding to the surfaces 31-61, 32-62 of the fourth preferred embodiment. The imaging lens 10 has an overall system focal length of 2.63 mm, an HFOV of 33.62°, an F-number of 2.2, and a system length of 3.22 mm.

Shown in FIG. 15 is a table that lists values of some optical parameters of the aforementioned optical relationship (1) corresponding to the fourth preferred embodiment.

Relationships among some of the aforementioned optical parameters corresponding to the fourth preferred embodiment are as follows:

AAG/CT3=1.33

EFL/CT3=5.7

(AC12+AC34)/CT2=0.76

AAG/CT2=2.23

CT3/CT2=1.67

CT1−CT3=0.001 mm

CT3+CT4=0.76 mm

CT3/AC12=5.62

FIGS. 16(a) to 16(d) show simulation results corresponding to longitudinal spherical aberration, sagittal astigmatism aberration, tangential astigmatism aberration, and distortion aberration of the fourth preferred embodiment, respectively. It can be understood from FIGS. 16(a), 16(b), 16(c) and 16(d) that the fourth preferred embodiment is likewise able to achieve a relatively good optical performance even with the system length reduced down to 3.22 mm.

Figure 17:
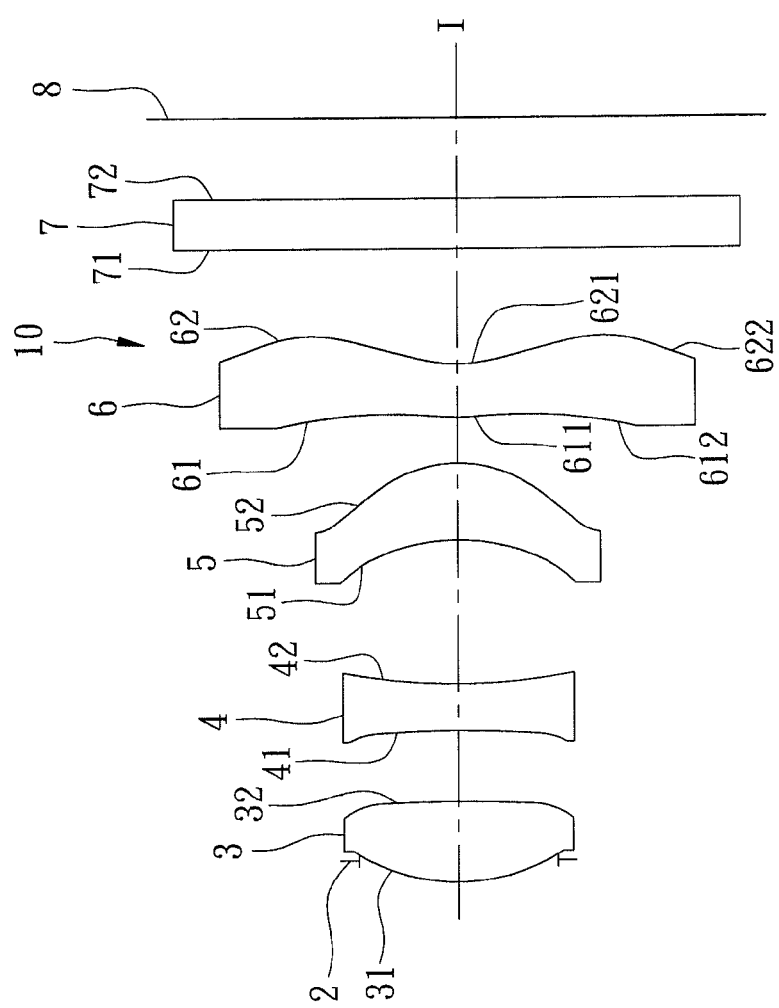
FIG. 17 is a schematic diagram that illustrates the fifth preferred embodiment of an imaging lens according to the present invention.
Figure 20:
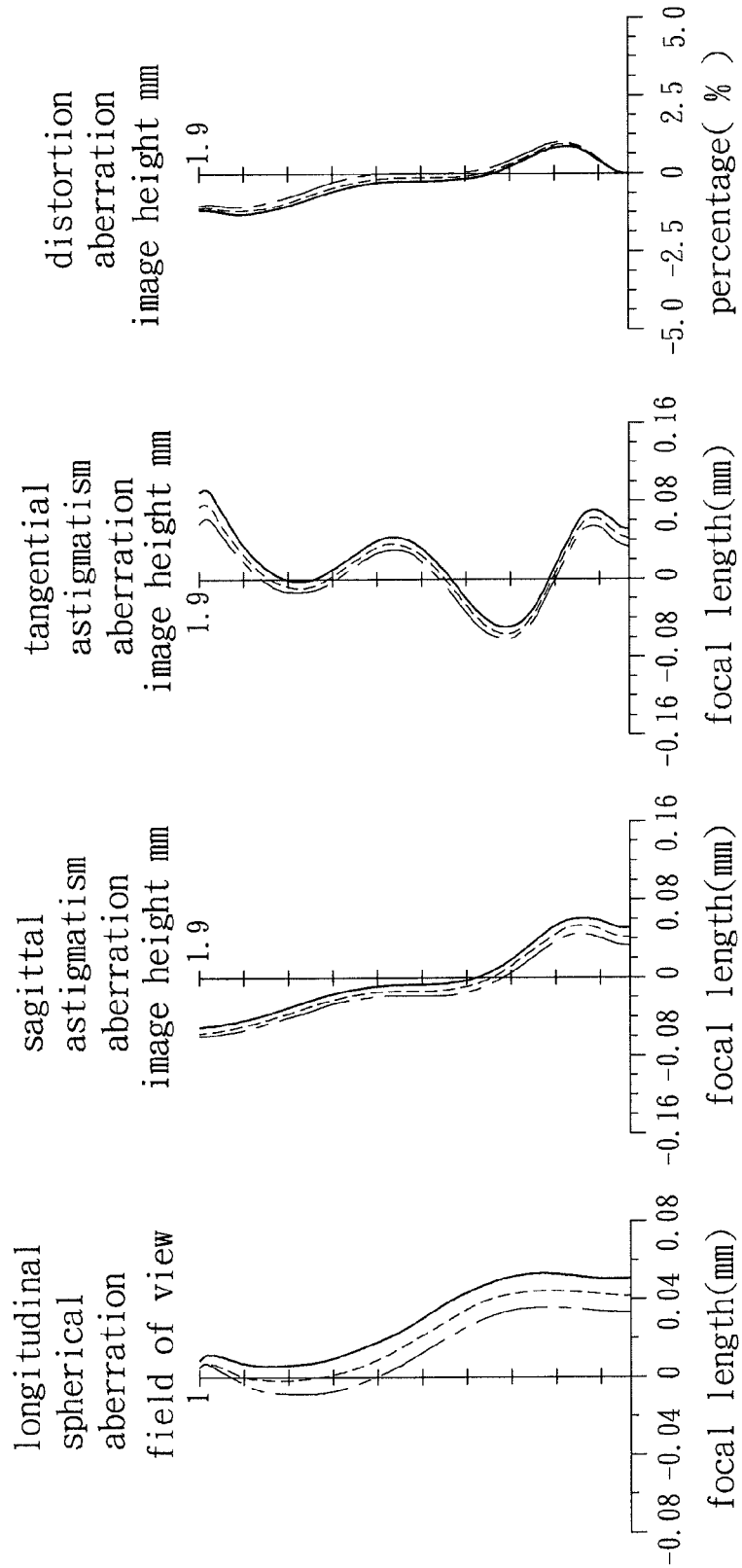
FIGS. 20(a) to 20(d) show different optical characteristics of the imaging lens of the fifth preferred embodiment.

FIG. 17 illustrates the fifth preferred embodiment of an imaging lens 10 according to the present invention, which has a configuration similar to the first preferred embodiment.

Shown in FIG. 18 is a table that lists values of some optical parameters corresponding to the surfaces 31-61, 32-62 of the fifth preferred embodiment. The imaging lens 10 has an overall system focal length of 2.66 mm, an HFOV of 35.61°, an F-number of 2.2, and a system length of 3.22 mm.

Shown in FIG. 19 is a table that lists values of some optical parameters of the aforementioned optical relationship (1) corresponding to the fifth preferred embodiment.

Relationships among some of the aforementioned optical parameters corresponding to the fifth preferred embodiment are as follows:

AAG/CT3=1.32

EFL/CT3=5.8

(AC12+AC34)/CT2=0.76

AAG/CT2=2.22

CT3/CT2=1.68

CT1−CT3=0.015 mm

CT3+CT4=0.76 mm

CT3/AC12=5.75

FIGS. 20(a) to 20(d) show simulation results corresponding to longitudinal spherical aberration, sagittal astigmatism aberration, tangential astigmatism aberration, and distortion aberration of the fifth preferred embodiment, respectively. It can be understood from FIGS. 20(a), 20(b), 20(c) and 20(d) that the fifth preferred embodiment is likewise able to achieve a relatively good optical performance even with the system length reduced down to 3.22 mm.

Figure 21:
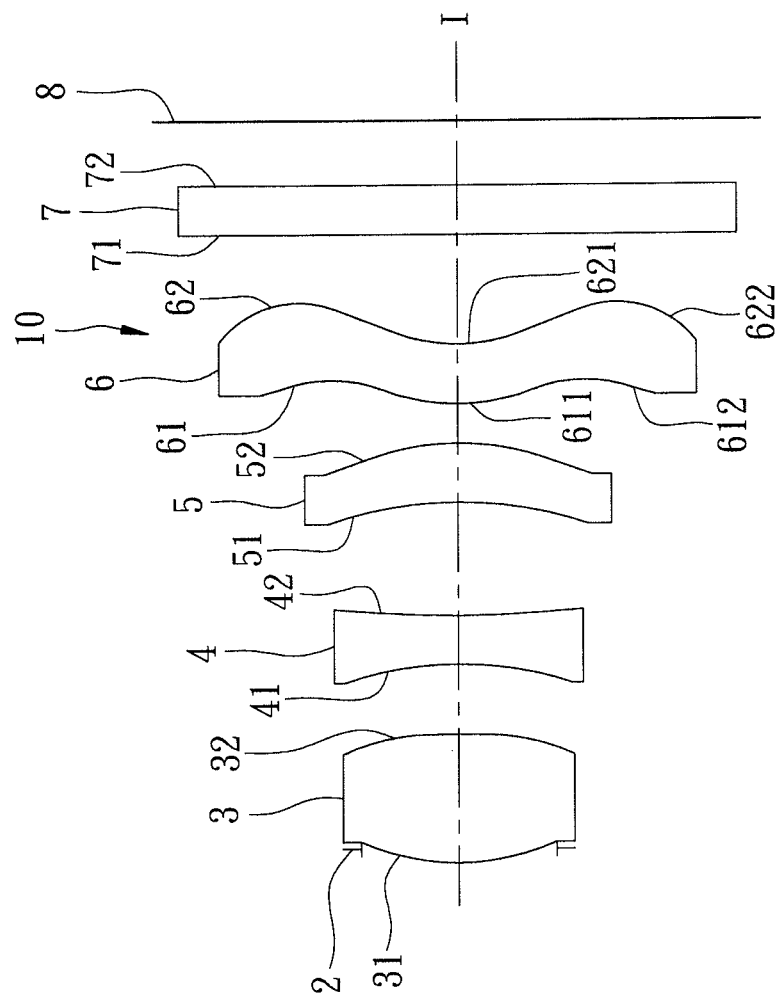
FIG. 21 is a schematic diagram that illustrates the sixth preferred embodiment of an imaging lens according to the present invention.
Figure 24:
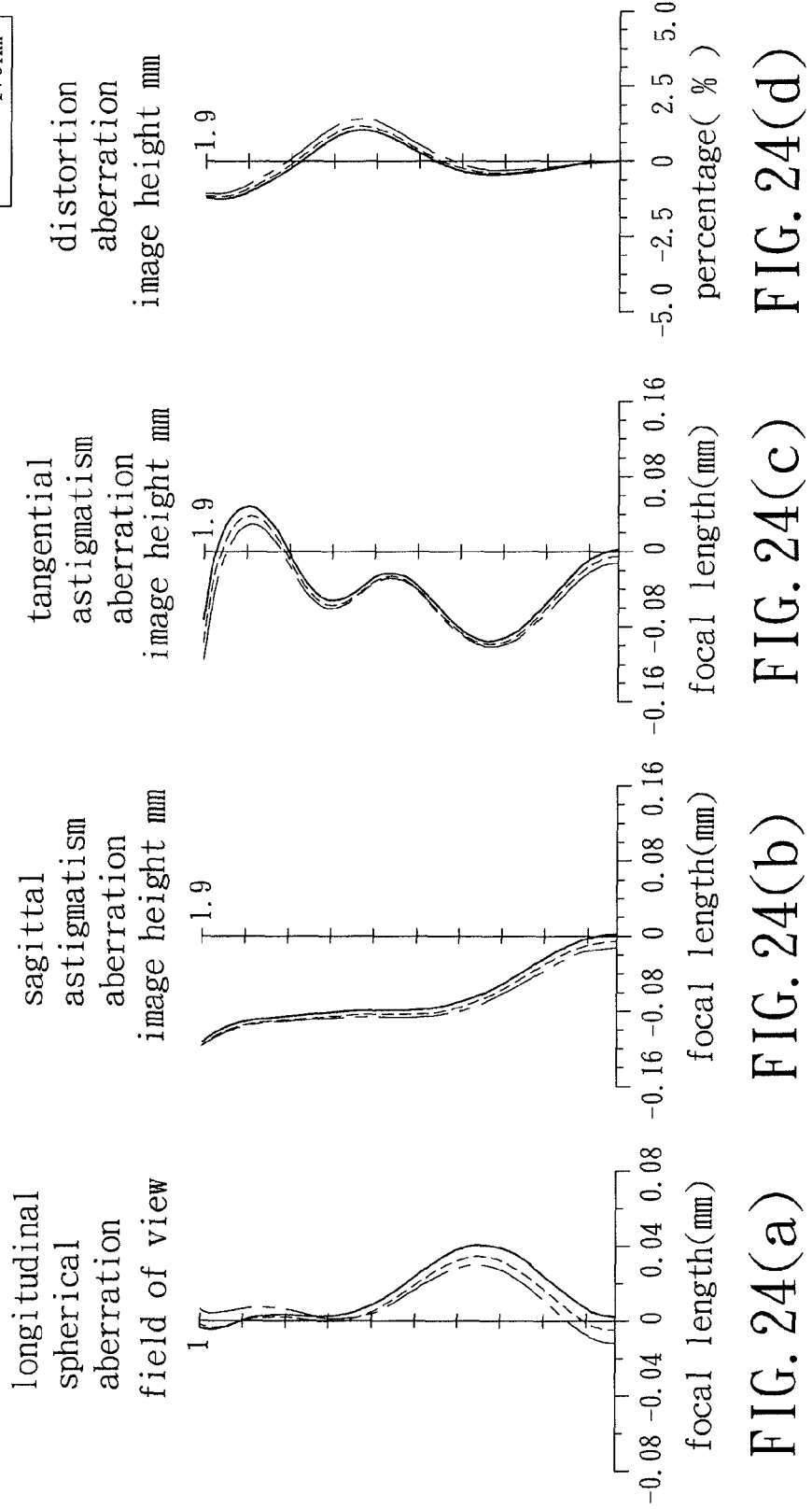
FIGS. 24(a) to 24(d) show different optical characteristics of the imaging lens of the sixth preferred embodiment.

FIG. 21 illustrates the sixth preferred embodiment of an imaging lens 10 according to the present invention, which has a configuration similar to the first preferred embodiment.

Shown in FIG. 22 is a table that lists values of some optical parameters corresponding to the surfaces 31-61, 32-62 of the sixth preferred embodiment. The imaging lens 10 has an overall system focal length of 2.63 mm, an HFOV of 35.62°, an F-number of 2.2, and a system length of 3.47 mm.

Shown in FIG. 23 is a table that lists values of some optical parameters of the aforementioned optical relationship (1) corresponding to the sixth preferred embodiment.

Relationships among some of the aforementioned optical parameters corresponding to the sixth preferred embodiment are as follows:

AAG/CT3=1.3

EFL/CT3=7.2

(AC12+AC34)/CT2=0.74

AAG/CT2=1.6

CT3/CT2=1.22

CT1−CT3=0.41 mm

CT3+CT4=0.72 mm

CT3/AC12=4.51

FIGS. 24(a) to 24(d) show simulation results corresponding to longitudinal spherical aberration, sagittal astigmatism aberration, tangential astigmatism aberration, and distortion aberration of the sixth preferred embodiment, respectively. It can be understood from FIGS. 24(a), 24(b), 24(c) and 24(d) that the sixth preferred embodiment is likewise able to achieve a relatively good optical performance even with the system length reduced down to 3.47 mm.

Shown in FIG. 25 is a table that lists the aforesaid relationships among some of the aforementioned optical parameters corresponding to the six preferred embodiments for comparison. When each of the optical parameters of the imaging lens 10 according to this invention satisfies the following optical relationships, the optical performance is still relatively good even when the system length is reduced down to below 4 mm:

$$AAG/CT3 \geq 1.3 \qquad (2)$$

$$EFL/CT3 \geq 5.6 \qquad (3)$$

$$(AC12 + AC34)/CT2 \geq 0.7 \qquad (4)$$

$$CT3/CT2 \leq 1.8 \qquad (5)$$

$$0 \text{ mm} \leq CT1 - CT3 \leq 0.5 \text{ mm} \qquad (6)$$

$$CT3 + CT4 \leq 0.8 \text{ mm} \qquad (7)$$

$$CT3/AC12 \leq 6 \qquad (8)$$

$$AAG/CT2 \geq 2.2 \qquad (9)$$

When the imaging lens 10 satisfies optical relationship (2), AAG and CT3 will respectively fall within a suitable range. Small thickness of the third lens element 5 leads to a small system length. In addition, AAG/CT3 is preferable to range between 1.3 and 2.5.

When the imaging lens 10 satisfies optical relationship (3), the third lens element 5 has a small thickness, thereby resulting in a small system length. In addition, EFL/CT3 is preferable to range between 5.6 and 8.

When the imaging lens 10 satisfies optical relationship (4), AC12, AC34 and CT2 will respectively fall within a suitable range. Large AC34 leads to a small thickness of the third lens element 5 and a small system length. In addition, (AC12+AC34)/CT2 is preferable to range between 0.7 and 1.3.

When the imaging lens 10 satisfies optical relationship (5), CT3 and CT2 will respectively fall within a suitable range. Thickness of the third lens element 5 will be larger than that of the second lens element 4 without being too large. In other words, when CT3/CT2>1.8, the third lens element 5 is too thick and is unfavorable for miniaturization of the imaging lens 10. In addition, CT3/CT2 is preferable to range between 1.2 and 1.8.

When the imaging lens 10 satisfies optical relationship (6), CT1 and CT3 will respectively fall within a suitable range. Small thicknesses of the first and third lens elements 3 and 5, and a relatively thicker the first lens element 3 enhance converging capability of the imaging lens 10 and favor reduction of the sensor dimensions. However, the first lens element 3 cannot be too thin. Since the first lens element 3 has the positive refractive power and at least one of the image-side and object-side surfaces 31 and 32 is convex, if the first lens element 3 is too thin, the thinner periphery of the first lens element 3 may result in adverse effects on manufacturing. In addition, CT1-CT3 is preferable to range between 0.2 mm and 0.5 mm.

When the imaging lens 10 satisfies optical relationship (7), CT3 and CT4 will respectively fall within a suitable range. The small thicknesses of the third and fourth lens elements 5, 6 favor reduction of the system length. In addition, CT3+CT4 is preferable to range between 0.58 mm and 0.8 mm.

When the imaging lens 10 satisfies optical relationship (8), the third lens element 5 will have a small thickness and favor reduction of the system length. In addition, CT3/AC12 is preferable to range between 2.7 and 6.

When the imaging lens 10 satisfies optical relationship (9), AAG and CT2 will respectively fall within a suitable range. Small CT2 indicates small thickness of the second lens element 4, and favors reduction of the system length. In addition, AAG/CT2 is preferable to range between 2.2 and 3.61.

To sum up, effects and advantages of the imaging lens 10 according to the present invention are described hereinafter.

1. The positive refractive power of the first lens element 3 may enhance converging capability, so as to separate the exit pupil from the image plane and reduce a chief ray angle of imaging light at a periphery of the sensor, thereby ensuring non-distortion of the image.

2. Through the concave image-side surface 42 of the second lens element 4, image aberration resulting from the first lens element 3 may be corrected and quality at the periphery of the image may be ensured. The positive refractive power of the third lens element 5 may share the refractive power of the first lens element 3 and thus reduce sensitivity of manufacture.

3. Through the aspherical object-side surface 61 of the fourth lens element 6, aberration at the periphery of the image may be corrected. In addition, since the imaging lens 10 satisfies AAG/CT3≥1.3, AAG and smaller CT3 will respectively fall within a suitable range to thereby favor reduction of the system length.

4. Through design of the relevant optical parameters, such as AAG/CT3, EFL/CT3, (AC12+AC34)/CT2, CT3/CT2, CT1-CT3, CT3+CT4, and CT3/AC12, optical aberrations, such as spherical aberration, may be reduced or eliminated. Further, through surface design and arrangement of the lens elements 3-6, even when the system length is reduced, optical aberrations may still be reduced or eliminated, resulting in relatively good optical performance.

5. Through the aforesaid six preferred embodiments, it is known that the system length of this invention may be reduced down to below 4 mm, so as to facilitate developing thinner relevant products with economic benefits.

Figure 26:
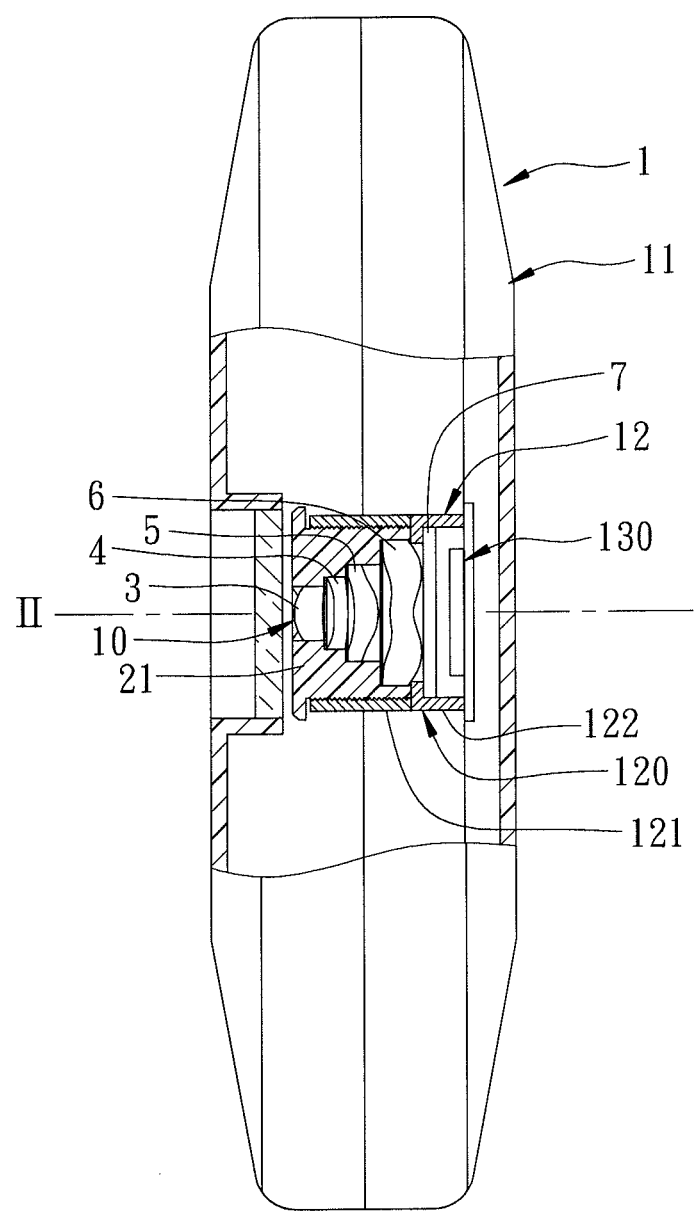
FIG. 26 is a schematic partly sectional view to illustrate a first exemplary application of the imaging lens of the present invention.

Shown in FIG. 26 is a first exemplary application of the imaging lens 10, in which the imaging lens 10 is disposed in a housing 11 of a portable electronic apparatus 1 (such as a mobile phone), and forms a part of an imaging module 12 of the portable electronic apparatus 1. The imaging module 12 includes a barrel 21 on which the imaging lens 10 is disposed, a seat unit 120 on which the barrel 21 is disposed, and an image sensor 130 disposed at the image plane 8 (see FIG. 1) and operatively associated with the imaging lens 10 for capturing images.

The seat unit 120 includes an auto-focusing module 121 in which the barrel 21 is disposed, and a sensor seat portion 122 having a portion interposed between the auto-focusing module 121 and the image sensor 130. The barrel 21 and the auto-focusing module 121 of the seat unit 120 extend along an axis (II), which coincides with the optical axis (I) of the imaging lens 10.

Figure 27:
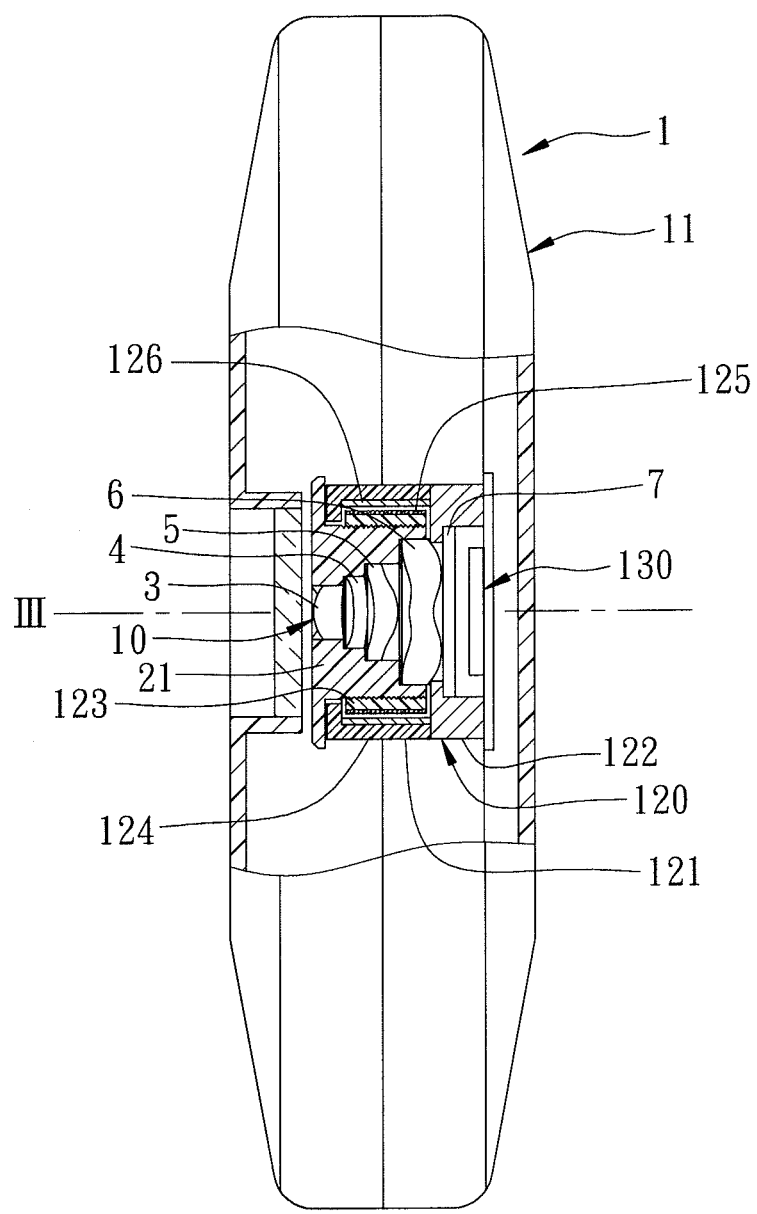
FIG. 27 is a schematic partly sectional view to illustrate a second exemplary application of the imaging lens of the present invention.

Shown in FIG. 27 is a second exemplary application of the imaging lens 10. The difference between the first and second exemplary applications resides in that, in the second exemplary application, the seat unit 120 is configured as a voice-coil motor (VCM), and the auto-focusing module 121 includes an inner seat section 123 in which the barrel 21 is disposed, an outer seat section 124 that surrounds the inner seat section 123, a coil 125 that is interposed between the inner and outer seat sections 123, 124, and a magnetic component 126 that is disposed between an outer side of the coil 125 and an inner side of the outer seat section 124.

The inner seat section 123 and the barrel 21, together with the imaging lens 10 therein, are movable with respect to the image sensor 130 along an axis (III), which coincides with the optical axis (I) of the imaging lens 10, for focus control of the imaging lens 10. The optical filter 7 of the imaging lens 10 is disposed at the sensor seat portion 122, which is disposed to abut against the outer seat section 124. Configuration and arrangement of other components of the electronic apparatus 1 in the second exemplary application are identical to those in the first exemplary application, and hence will not be described hereinafter for the sake of brevity.

By virtue of the imaging lens 10 of the present invention, the electronic apparatus 1 in each of the exemplary applications may be configured to have a relatively reduced overall system length with good optical and imaging performance, so as to reduce cost of materials, and satisfy requirements of product miniaturization.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An imaging lens comprising first, second, third, and fourth lens elements arranged from an object side to an image side in the given order, each of said first, second, third, and fourth lens elements having an object-side surface facing toward the object side and an image-side surface facing toward the image side, wherein:
    said first lens element has a positive refractive power;
    said second lens element has a negative refractive power, said object-side surface of said second lens element being a concave surface, said image-side surface of said second lens element being a concave surface;
    said third lens element has a positive refractive power; and
    said object-side surface of said fourth lens element is a curved surface and has a convex portion in a vicinity of an optical axis of said imaging lens, and a concave portion in a vicinity of a periphery of said fourth lens element;
    wherein said imaging lens satisfies $AAG/CT3 \geq 1.3$, where
    AAG represents a sum of a distance between said image-side surface of said first lens element and said object-side surface of said second lens element at the optical axis, a distance between said image-side surface of said second lens element and said object-side surface of said third lens element at the optical axis, and a distance between said image-side surface of said third lens element and said object-side surface of said fourth lens element at the optical axis, and
    CT3 represents a distance between said object-side surface and said image-side surface of said third lens element at the optical axis; and
    wherein said imaging lens does not include any lens element with refractive power other than said first, second, third, and fourth lens elements.

2. The imaging lens as claimed in claim 1, further satisfying $EFL/CT3 \geq 5.6$, where EFL represents an effective focal length of said imaging lens.

3. The imaging lens as claimed in claim 2, further satisfying $(AC12+AC34)/CT2 \geq 0.7$, where
    AC12 represents the distance between said image-side surface of said first lens element and said object-side surface of said second lens element at the optical axis,
    AC34 represents the distance between said image-side surface of said third lens element and said object-side surface of said fourth lens element at the optical axis, and
    CT2 represents a distance between said object-side surface and said image-side surface of said second lens element at the optical axis.

4. The imaging lens as claimed in claim 3, further satisfying $0 \text{ mm} \leq CT1-CT3 \leq 0.5 \text{ mm}$, where CT1 represents a distance between said object-side surface and said image-side surface of said first lens element at the optical axis.

5. The imaging lens as claimed in claim 4, further satisfying $CT3/CT2 \leq 1.8$.

6. The imaging lens as claimed in claim 4, further satisfying $CT3+CT4 \leq 0.8 \text{ mm}$, where CT4 represents a distance between said object-side surface and said image-side surface of said fourth lens element at the optical axis.

7. The imaging lens as claimed in claim 2, further satisfying $AAG/CT2 \geq 2.2$, where CT2 represents a distance between said object-side surface and said image-side surface of said second lens element at the optical axis.

8. The imaging lens as claimed in claim 7, further satisfying $0.2 \text{ mm} \leq CT1-CT3 \leq 0.5 \text{ mm}$, where CT1 represents a distance between said object-side surface and said image-side surface of said first lens element at the optical axis.

9. The imaging lens as claimed in claim 7, further satisfying $CT3+CT4 \leq 0.8 \text{ mm}$, where CT4 represents a distance between said object-side surface and said image-side surface of said fourth lens element at the optical axis.

10. The imaging lens as claimed in claim 1, further satisfying $(AC12+AC34)/CT2 \geq 0.7$, where
    AC12 represents the distance between said image-side surface of said first lens element and said object-side surface of said second lens element at the optical axis,
    AC34 represents the distance between said image-side surface of said third lens element and said object-side surface of said fourth lens element at the optical axis, and
    CT2 represents a distance between said object-side surface and said image-side surface of said second lens element at the optical axis.

11. The imaging lens as claimed in claim 10, further satisfying $CT3/CT2 \leq 1.8$.

12. The imaging lens as claimed in claim 11, further satisfying $CT3+CT4 \leq 0.8 \text{ mm}$, where CT4 represents a distance between said object-side surface and said image-side surface of said fourth lens element at the optical axis.

13. The imaging lens as claimed in claim 10, further satisfying $CT3/AC12 \leq 6$.

14. The imaging lens as claimed in claim 13, further satisfying $CT3+CT4 \leq 0.8 \text{ mm}$, where CT4 represents a distance between said object-side surface and said image-side surface of said fourth lens element at the optical axis.

15. The imaging lens as claimed in claim 1, further satisfying $CT3/CT2 \leq 1.8$, where CT2 represents a distance between said object-side surface and said image-side surface of said second lens element at the optical axis.

16. The imaging lens as claimed in claim 15, further satisfying $0.1 \text{ mm} \leq CT1-CT3 \leq 0.5 \text{ mm}$, where CT1 represents a distance between said object-side surface and said image-side surface of said first lens element at the optical axis.

17. A portable electronic apparatus comprising:
    a housing; and
    an imaging module disposed in said housing, and including an imaging lens as claimed in claim 1, a barrel on which said imaging lens is disposed, a seat unit on which said barrel is disposed, and an image sensor disposed at the image side and operatively associated with said imaging lens for capturing images.

18. The portable electronic apparatus as claimed in claim 17, wherein said seat unit includes an auto-focusing module including an inner seat section in which said barrel is disposed, and an outer seat section that surrounds said inner seat section, said inner seat section of said auto-focusing module, said barrel, and said imaging lens being movable together with respect to said image sensor along the optical axis.

19. The portable electronic apparatus as claimed in claim 18, wherein said seat unit further includes a sensor seat portion, which is disposed between said outer seat section of said auto-focus module and said image sensor, and which is disposed to abut against said outer seat section.

* * * * *